United States Patent
Inoue et al.

(10) Patent No.: US 9,428,391 B2
(45) Date of Patent: Aug. 30, 2016

(54) METHOD AND APPARATUS FOR PRODUCING CARBON NANOTUBES

(75) Inventors: Yoku Inoue, Hamamatsu (JP); Adrian Ghemes, Hamamatsu (RO); Haibo Zhao, Hamamatsu (CH)

(73) Assignee: NATIONAL UNIVERSITY CORPORATION SHIZUOKA UNIVERSITY (JP)

( * ) Notice: Subject to any disclaimer, the term of this patent is extended or adjusted under 35 U.S.C. 154(b) by 0 days.

(21) Appl. No.: 14/116,361

(22) PCT Filed: May 10, 2012

(86) PCT No.: PCT/JP2012/062054
§ 371 (c)(1),
(2), (4) Date: Feb. 13, 2014

(87) PCT Pub. No.: WO2012/153816
PCT Pub. Date: Nov. 15, 2012

(65) Prior Publication Data
US 2014/0199230 A1    Jul. 17, 2014

(30) Foreign Application Priority Data
May 10, 2011 (JP) ................. P2011-105464

(51) Int. Cl.
*C01B 31/02* (2006.01)
*B01J 19/24* (2006.01)
(Continued)

(52) U.S. Cl.
CPC ............ *C01B 31/0226* (2013.01); *B01J 19/24* (2013.01); *B82Y 30/00* (2013.01); *B82Y 40/00* (2013.01); *C01B 31/0233* (2013.01); *C01B 2202/06* (2013.01); *C01B 2202/34* (2013.01)

(58) Field of Classification Search
CPC ............ C01B 31/0253; C01B 31/026; C01B 31/0266; C01B 31/0273; C01B 31/028; C01B 31/0286; C01B 31/0293; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B82Y 5/00; B82Y 10/00; B82Y 15/00; B82Y 20/00; B82Y 25/00; B82Y 30/00; B82Y 35/00; B82Y 40/00; B82Y 99/00; D01F 9/10; D01F 9/127; D01F 9/1271; D01F 9/1272; D01F 9/1273; D01F 9/1274; D01F 9/1275; D01F 9/1276; D01F 9/1277; D01F 9/1278
USPC ........ 423/447.1–447.3, 445 B; 977/742–754, 977/842–848
See application file for complete search history.

(56) References Cited

U.S. PATENT DOCUMENTS

| 6,331,209 B1 * | 12/2001 | Jang ............. B82Y 10/00 117/103 |
| 6,790,426 B1 * | 9/2004 | Ohsaki .......... B82Y 30/00 423/447.2 |
| 2011/0008240 A1 * | 1/2011 | Inoue et al. ............ 423/447.7 |

FOREIGN PATENT DOCUMENTS

| CN | 1270920 A | 10/2000 |
| CN | 101041427 A | 9/2007 |

(Continued)

OTHER PUBLICATIONS

Machine translation of JP 2006-69805 to Okamura, et al.*

(Continued)

*Primary Examiner* — Daniel C McCracken
(74) *Attorney, Agent, or Firm* — Ostrolenk Faber LLP (57) ABSTRACT

Carbon nanotubes are grown by supplying raw material gas 30 comprising a carbon compound to be a raw material of the carbon nanotubes into the inside of a reaction vessel tube 14 in which a catalyst 26 to grow the carbon nanotubes is charged. At this time, halogen-containing material gas 32 to reduce the amount of a carbon product such as amorphous carbon produced besides carbon nanotubes that deposits on the surface of catalyst particles 44 due to supply of the raw material gas 30 is further supplied into the inside of the reaction vessel tube 14. Thereby, it is possible to produce elongated carbon nanotubes.

7 Claims, 7 Drawing Sheets

(51) Int. Cl.
*B82Y 30/00* (2011.01)
*B82Y 40/00* (2011.01)

(56) References Cited

FOREIGN PATENT DOCUMENTS

| | | |
|---|---|---|
| CN | 101748380 A | 6/2010 |
| CN | 101959793 A | 1/2011 |
| EP | 1 987 878 A1 | 11/2008 |
| JP | 2005-015870 | 1/2005 |
| JP | 2005-350308 | 12/2005 |
| JP | 2006-069805 | 3/2006 |
| JP | 2006-265006 | 10/2006 |
| JP | 2007-126311 | 5/2007 |
| JP | 2010-138064 | 6/2010 |
| WO | WO 2006/011655 A1 | 2/2006 |
| WO | WO 2009/107603 A1 | 9/2009 |
| WO | WO 2009/126602 A1 | 10/2009 |

OTHER PUBLICATIONS

PCT/IB/338 Notification of Transmittal of Translation of the International Preliminary Report on Patentability including Form PCT/IPEA/409 in counterpart WO Patent Application No. PCT/JP2012/06205 in English dated Nov. 14, 2013 (4 pages).

International Search Report mailed Jun. 12, 2012 in counterpart Application No. PCT/JP2012/062054.

Extended European Search Report dated Oct. 29, 2014 for counterpart EP Patent Application No. 12782068.6.

Fourth Office Action issued May 9, 2016 in corresponding Chinese Patent Application No. 201280022296.6 (English translation).

* cited by examiner

Fig.7

# METHOD AND APPARATUS FOR PRODUCING CARBON NANOTUBES

CROSS-REFERENCE TO RELATED APPLICATIONS

The present application is a 35 U.S.C. §§371 national phase conversion of PCT/JP2012/062054, filed May 10, 2012, which claims priority to Japanese Patent Application No. 2011-105464, filed May 10, 2011, the contents of both of which are incorporated herein by reference. The PCT International Application was published in the Japanese language.

TECHNICAL FIELD

The present invention relates to a method and apparatus for producing carbon nanotubes.

BACKGROUND ART

In Patent Literature 1, a technology concerning a method for producing carbon nanotubes (CNTs) is described. In the method described in this literature, first, clusters are made. That is, clusters are made by filling mixed gas of helium and methane in a vacuum vessel and applying current between two graphite rods, into which catalyst metal such as nickel is embedded, in the vacuum vessel to cause discharge. Next, after the clusters thus made are collected, the clusters are deposited on a silicon substrate by vacuum deposition. Then, synthesis of carbon nanotubes are performed using the micro wave plasma CVD method.

In Patent Literature 2, a method for easily producing vertically oriented carbon nanotubes and producing elongated carbon nanotube fibers and the like from the vertically oriented carbon nanotubes is disclosed.

In Patent Literature 3, a technique for elongating carbon nanotubes by adding an oxidizing agent such as water in a reaction atmosphere at the time of growing carbon nanotubes is disclosed.

CITATION LIST

Patent Literature

Patent Literature 1: Japanese Patent Application Laid-Open No. 2006-265006
Patent Literature 2: International Publication No. WO 2009/107603
Patent Literature 3: International Publication No. WO 2006/011655

SUMMARY OF INVENTION

Technical Problem

Carbon nanotubes are materials having excellent properties such as high mechanical strength, lightweight, good electric conductivity, good heat property, high chemical corrosion resistance, and good field emission characteristics. Accordingly, as applications of carbon nanotubes, lightweight high strength wires, probes of scanning probe microscopes (SPMs), cold cathodes for field emission displays (FEDs), conductive resins, high strength resins, corrosion-resistant resins, abrasion-resistant resins, highly lubricating resins, electrodes for secondary batteries and fuel cells, interlayer wiring materials of LSIs, and biosensors are contemplated.

Methods for producing carbon nanotubes include the arc discharge method, the laser evaporation method, and chemical vapor deposition method (CVD method). In the CVD method, carbon nanotubes can be synthesized in accordance with the following method, for example. That is, after metal to be a catalyst is placed in a vessel, the temperature within the vessel is set to, for example, 650° C. to 1300° C., and hydrocarbon or the like as a carbon source is supplied in this vessel. In one example, a metal film as a catalyst is formed by sputtering or the like on the surface of a substrate having a flat surface. Then, this substrate is placed in a furnace, the temperature in the furnace is increased to the predetermined temperature, chemical reaction between gas and the catalyst is caused by supply of gas containing acetylene, hydrogen, ammonia, and the like into the furnace, thereby to form carbon nanotubes on the substrate surface. These carbon nanotubes are oriented substantially vertically to the substrate surface.

However, in the conventional production method described in Patent Literature 2 and the like, the length of carbon nanotubes is up to about 2 mm at the maximum. A method by which more elongated carbon nanotubes suitable for the material for lightweight high strength wire and the like may be produced is desired.

The present invention has prepared in the view of such a problem, and aims to provide a method and apparatus that can produce elongated carbon nanotubes.

Solution to Problem

To solve the problems described above, a method for producing carbon nanotubes according to one embodiment comprises a step of growing carbon nanotubes by supplying a carbon compound to be a raw material of carbon nanotubes in a vessel in which a catalyst to grow carbon nanotubes is charged, wherein, in the step, a halogen-containing material comprising at least one of a halogen simple substance and a halogen compound is further supplied into the vessel in order to reduce the amount of a carbon product produced that deposits on the catalyst surface besides carbon nanotubes due to supply of the carbon compound.

An apparatus for producing carbon nanotubes according to one embodiment comprises a vessel in which a catalyst to grow carbon nanotubes is charged; a raw material supply section for supplying a carbon compound to be a raw material of carbon nanotubes into the vessel; a halogen-containing material supply section for further supplying a halogen-containing material comprising at least one of a halogen simple substance and a halogen compound in order to reduce the amount of a carbon product produced that deposits on the catalyst surface, besides carbon nanotubes, due to supply of the carbon compound.

The inventors have conducted a study on factors to inhibit growth of carbon nanotubes at the time of growing carbon nanotubes. As the result, when a carbon compound to be the raw material of carbon nanotubes is supplied into the vessel, the inventors have found that a carbon product, for example, amorphous carbon, produced by pyrolysis of the carbon compound increasingly deposits on a catalyst, and growth of carbon nanotubes is arrested at a certain length due to gradual decrease in the catalytic action by this carbon product (so-called catalyst deactivation). In a view of such a phenomenon, the above described method and apparatus for producing carbon nanotubes supply, at the time of growing carbon nanotubes, in addition to a carbon compound to be the raw material of carbon nanotubes, a halogen-containing material including at least one of a halogen simple substance and a halogen compound to reduce formation of a carbon product such as amorphous carbon that deposits on the catalyst surface. Thereby, it is possible to inhibit the catalyst action from gradually decreasing and to grow carbon nanotubes more elongated because the amount of a carbon product to be deposited on the catalyst during growth of carbon nanotubes is reduced. That is, in accordance with the above described method and apparatus for producing carbon nanotubes, it is possible to produce elongated carbon nanotubes.

In the above-described method for producing carbon nanotubes, compared to the amount of the halogen-containing material to be supplied per unit time at the starting time $t_0$ of supplying halogen-containing material, the amount of the halogen-containing material to be supplied per unit time at the time $t_1$ later than the time $t_0$ may be larger. Similarly, the above-described apparatus for producing carbon nanotubes further comprises a control unit that controls supply of a carbon compound in the raw material supply section and supply of a halogen-containing material in the halogen-containing material supply section, and the control unit may increase, compared to the amount of the halogen-containing material to be supplied per unit time at the starting time $t_0$ of supplying halogen-containing material, the amount of the halogen-containing material to be supplied per unit time at the time $t_1$ later than the time $t_0$. According to the findings of the inventors, the amount of a carbon product to be deposited on the catalyst tends to increase as the time elapses after start of supplying the carbon compound. Accordingly, it is possible to reduce more effectively the amount of a carbon product to be deposited on the catalyst during growth of carbon nanotubes through increasing the amount of the halogen-containing material to be supplied depending on elapse of time as described above.

In the above described method for producing carbon nanotubes, the catalyst may comprise iron halide compounds. Specific examples of iron halide compounds include one of $FeF_2$, $FeF_3$, $FeCl_2$, $FeCl_3$, $FeBr_2$, $FeBr_3$, $FeI$, $FeI_2$, and $FeI_3$, or combinations of a plurality of these. In addition, hydrates of these compounds, which are easy to handle, are included in the above described iron halide compounds. It is possible to suitably grow carbon nanotubes by use of such a catalyst.

In the above-described method and apparatus for producing carbon nanotubes, the halogen-containing material may comprise at least one of $F_2$, $Cl_2$, $Br_2$, $HF$, $CF_4$, $HCl$, and $HBr$. Thereby, it is possible to suitably reduce deposition of a carbon product such as amorphous carbon on the catalyst.

Advantageous Effects of Invention

In accordance with the method and apparatus for producing carbon nanotubes according to the present invention, it is possible to produce elongated carbon nanotubes.

DESCRIPTION OF EMBODIMENTS

Embodiments of the method for producing carbon nanotubes are described hereinbelow in detail by referring to the accompanying drawings. In this context, the same reference numerals are given to the same elements, and overlapping description will be omitted in the description of the drawings.

Figure 1:
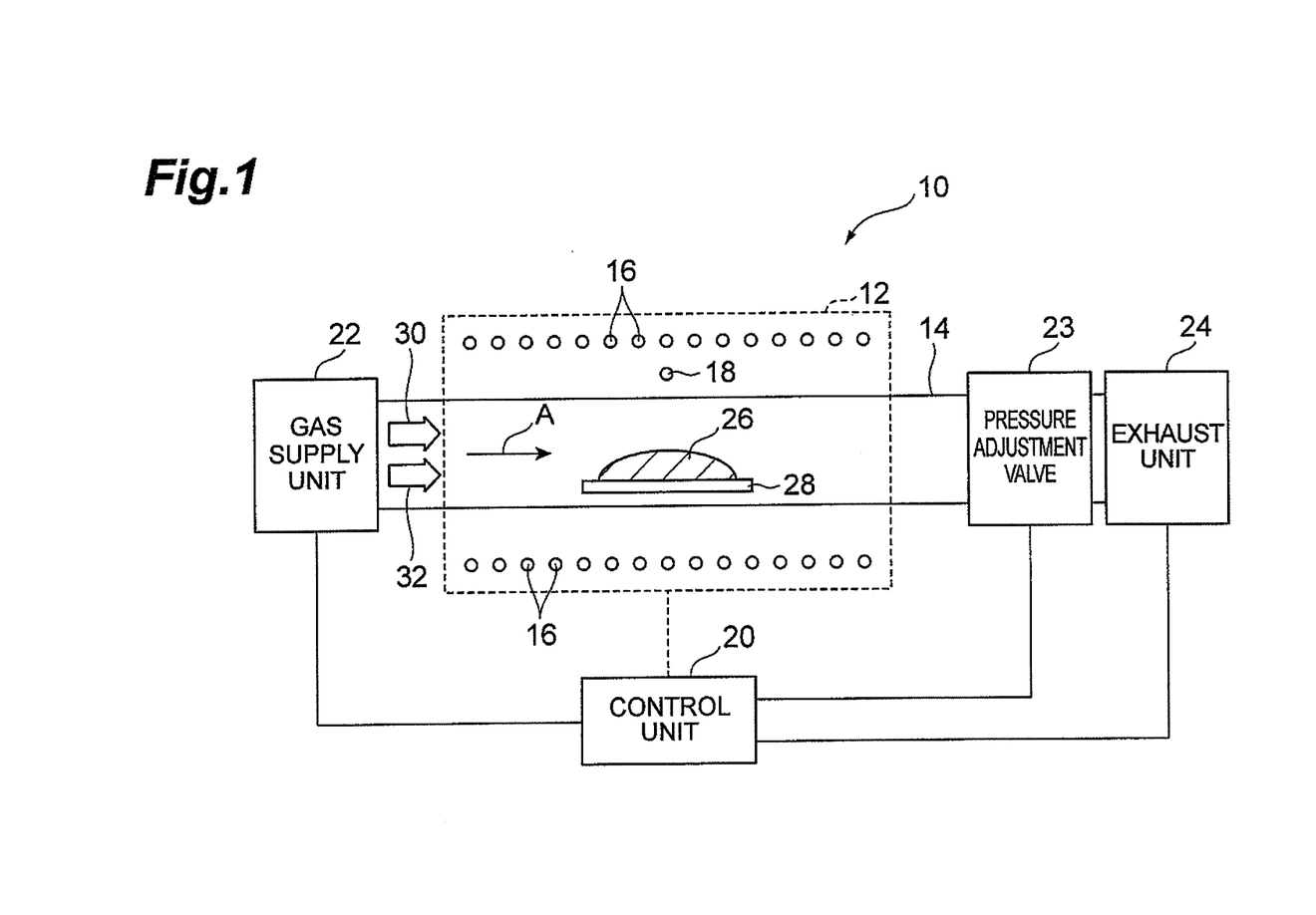
FIG. 1 is a view schematically showing the structure of a production apparatus used in a method for producing carbon nanotubes according to one embodiment.

FIG. 1 is a view schematically showing the structure of a production apparatus used in a method for producing carbon nanotubes according to one embodiment. As shown in FIG. 1, this production apparatus 10 includes an electric furnace 12. This electric furnace 12 has a substantially cylindrical shape extending along the predetermined direction A (the direction in which raw material gas flows). Inside the electric furnace 12, a reaction vessel tube 14 as a growth chamber for carbon nanotubes is passed through. The reaction vessel tube 14 is a substantially cylindrical member made of a heat resistant material, for example, quartz, has a thinner outer diameter than the electric furnace 12, and extends along the predetermined direction A. Inside the reaction vessel tube 14, a substrate 28 made of, for example, quartz and a catalyst 26, for example, $FeCl_2$ are mounted.

The surface of the substrate 28 is at least made of silicon oxides, preferably quartz ($SiO_2$) as this embodiment. Carbon nanotubes grow on this surface made of silicon oxides. In addition to $SiO_2$, which is known so-called quartz, silicon oxides include SiO. Silicon oxides formed by sputtering and the like have an oxygen/silicon ratio which has been changed from these (for example, $SiO_{1.9}$) and is not constant. Including these, the surface of the substrate 28 may be made of SiOx (x≤2).

The electric furnace 12 has heaters 16 and a thermocouple 18. The heaters 16 are arranged so as to enclose the reaction vessel tube 14, and generate heat to increase the inner-tube temperature of the reaction vessel tube 14. The thermocouple 18 is placed in the vicinity of the reaction vessel tube 14 in the electric furnace 12 and generates electrical signals in response to the temperature of the reaction vessel tube 14. The heaters 16 and the thermocouple 18 are electrically connected to a control unit 20. The control unit 20 controls power to be supplied to the heaters 16 on the basis of the electrical signals provided from the thermocouple 18 such that the inside of the reaction vessel tube 14 approaches the predetermined temperature suitable for growth of carbon nanotubes.

A gas supply unit 22 is connected to one end of the reaction vessel tube 14 in the predetermined direction A. The gas supply unit 22 is a raw material supply section that supplies raw material gas 30 (for example, hydrocarbon gas such as acetylene) to be the raw material of carbon nanotubes to the inside of the reaction vessel tube 14. Furthermore, the gas supply unit 22 of this embodiment is a halogen-containing material supply section that supplies halogen-containing material 32, which is a halogen-containing material to reduce deposition of a carbon product such as amorphous carbon during growth of carbon nanotubes, to the inside of the reaction vessel tube 14. The halogen-containing material gas 32 may be a gas containing at least one of a halogen simple substance and a halogen compound, and it is preferable that the halogen-containing material gas is a gas that contains at least one of, for example, $F_2$, $Cl_2$, $Br_2$, HF, $CF_4$, HCl, and HBr.

To the other end of the reaction vessel tube 14 in the predetermined direction A, a pressure adjustment valve 23 and an exhaust unit 24 are connected. The pressure adjustment valve 23 adjusts the pressure of gas in the reaction vessel tube 14. The exhaust unit 24 evacuates inside the reaction vessel tube 14. As the exhaust unit 24, for example, a rotary pump is suitable. The gas supply unit 22, the pressure adjustment valve 23 and the exhaust unit 24 are controlled via the control unit 20. The control unit 20 controls supply of the raw material gas 30 and a halogen-containing material gas 32 (the supply timing and amount to be supplied) in the gas supply unit 22.

Figure 2:
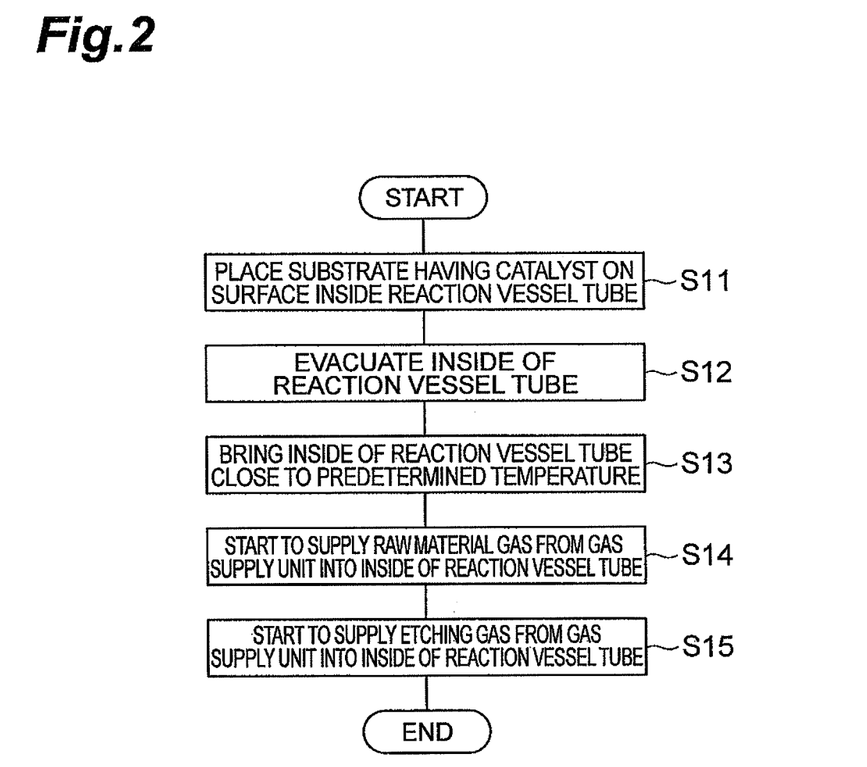
FIG. 2 is a flowchart showing a production method according to one embodiment.

Next, the method for producing carbon nanotubes according to this embodiment is described. FIG. 2 is a flowchart showing the production method according to this embodiment.

First, in step S11, a substrate 28 having a catalyst 26 on its surface is placed inside the reaction vessel tube 14. In this case, it is not necessary for the catalyst 26 to exist on the substrate 28, and the catalyst 26 and the substrate 28 may be placed apart from each other in the reaction vessel tube 14. Alternatively, in the case that carbon nanotubes are grown only on the inner wall of the reaction vessel tube 14, only the catalyst 26 is placed inside the reaction vessel tube 14, and the substrate 28 may be omitted. As the catalyst 26, it is possible to use iron halide compounds, such as iron chloride powder containing at least one of ferrous chloride ($FeCl_2$) and ferric chloride ($FeCl_3$), for example.

In subsequent step S12, the exhaust unit 24 evacuates inside the reaction vessel tube 14 by an instruction from the control unit 20. At this time, it is preferable that the exhaust unit 24 may evacuate the inside of the reaction vessel tube 14 such that the pressure in the reaction vessel tube 14 becomes $10^{-2}$ Torr or less. In this context, 1 Torr is converted into 133.3 Pa.

In step S13, the control unit 20 controls power to be supplied to the heaters 16 on the basis of the electrical signals from the thermocouple 18 such that the inside of the reaction vessel tube 14 approaches the predetermined temperature. In this context, the predetermined temperature is set to a temperature which is high enough to cause boiling or sublimating to be in a gas phase of the catalyst 26 in a solid phase at normal temperature, and at which gas phase reaction occurs between the raw material gas to be supplied inside the reaction vessel tube 14 and the catalyst 26. In one example, the predetermined temperature is a temperature in a range of 700° C. or more to 900° C. or less.

In step S14, by an instruction from the control unit 20, the gas supply unit 22 starts to supply the raw material gas 30 toward inside the reaction vessel tube 14. Alternatively, by an instruction from the control unit 20, the pressure adjustment valve 23 adjusts the pressure of the raw material gas 30 such that the pressure approaches the predetermined pressure. By these actions, the raw material gas 30 at the predetermined pressure and the predetermined flow rate starts to be supplied inside the reaction vessel tube 14. The predetermined pressure is preferably within a range of 1 Torr or more to 50 Torr or less, for example. Additionally, the predetermined flow rate is set depending on the inner diameter of the reaction vessel tube 14, and in the case that carbon nanotubes are grown in a quartz reaction vessel tube 14 with the inner diameter of about 30 mm, for example, the flow rate is preferably in a range of 20 sccm or more to 500 sccm or less. One sccm represents the flow rate of one milliliter per minute at 0° C. under 1 atm. In this context, the range of such a suitable flow rate depends on the inner diameter and volume of the reaction vessel tube 14. When the raw material gas 30 starts to be supplied inside the reaction vessel tube 14, the sublimated catalyst 26 and the raw material gas 30 start to react in gas phase, and carbon nanotubes start to grow vertically oriented on the substrate 28.

Specifically, in the case that ferrous chloride ($FeCl_2$) is used as the catalyst 26 and the raw material gas 30 is acetylene, the following chemical reaction occurs inside the reaction vessel tube 14.

$$FeCl_2 + C_2H_2 \rightarrow FeC_2 + 2HCl \tag{1}$$

In this way, ferrous chloride and acetylene react in gas phase, so that $FeC_2$ and hydrogen chloride are formed. $FeC_2$ powder repeats collision to each other to thereby deposit on the substrate 28. Fe contained in $FeC_2$ will be the main constituent of the catalyst action by the catalyst 26. That is, carbon precipitates from $FeC_2$ leaving Fe ($FeC_2 \rightarrow Fe + 2C$) to form a graphene layer. This is believed to be start of growth of carbon nanotubes. In this case, the left Fe becomes catalyst particles to deposit on the substrate 28.

Figure 3:
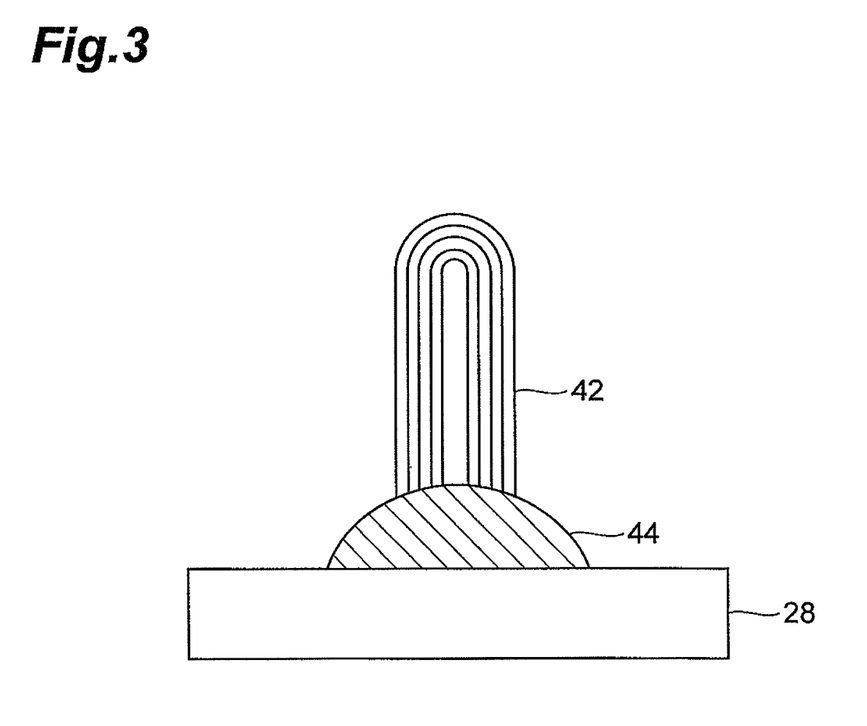
FIG. 3 is a view showing a manner of a carbon nanotube when growing upward from a catalyst particle formed on a substrate.

FIG. 3 is a view showing a manner of a carbon nanotube 42 when growing upward from a catalyst particle formed on the substrate 28. When acetylene supplied as the raw material gas 30 comes in contact with Fe formed as described above, the acetylene is decomposed into carbon and hydrogen. This carbon will be the raw material of carbon nanotubes 42 to contribute to their growth.

If the raw material gas 30 is now supplied in the reaction vessel tube 14, a carbon product, for example, amorphous carbon increasingly deposits on catalyst particles 44. Then, this carbon product gradually decreases the effect of the catalyst particles 44. In view of such a problem, in this embodiment, in step S15, by an instruction from the control unit 20, the gas supply unit 22 starts to supply halogen-containing material gas 32 toward inside the reaction vessel tube 14. When the halogen-containing material gas 32 is supplied inside the reaction vessel tube 14, deposition of a carbon product, such as amorphous carbon on the catalyst particles 44 is reduced. Thereby, the amount of a carbon product to be deposited on the catalyst particles 44 is reduced during growth of carbon nanotubes, and catalysis of the catalyst particles 44 is maintained.

Figure 4:
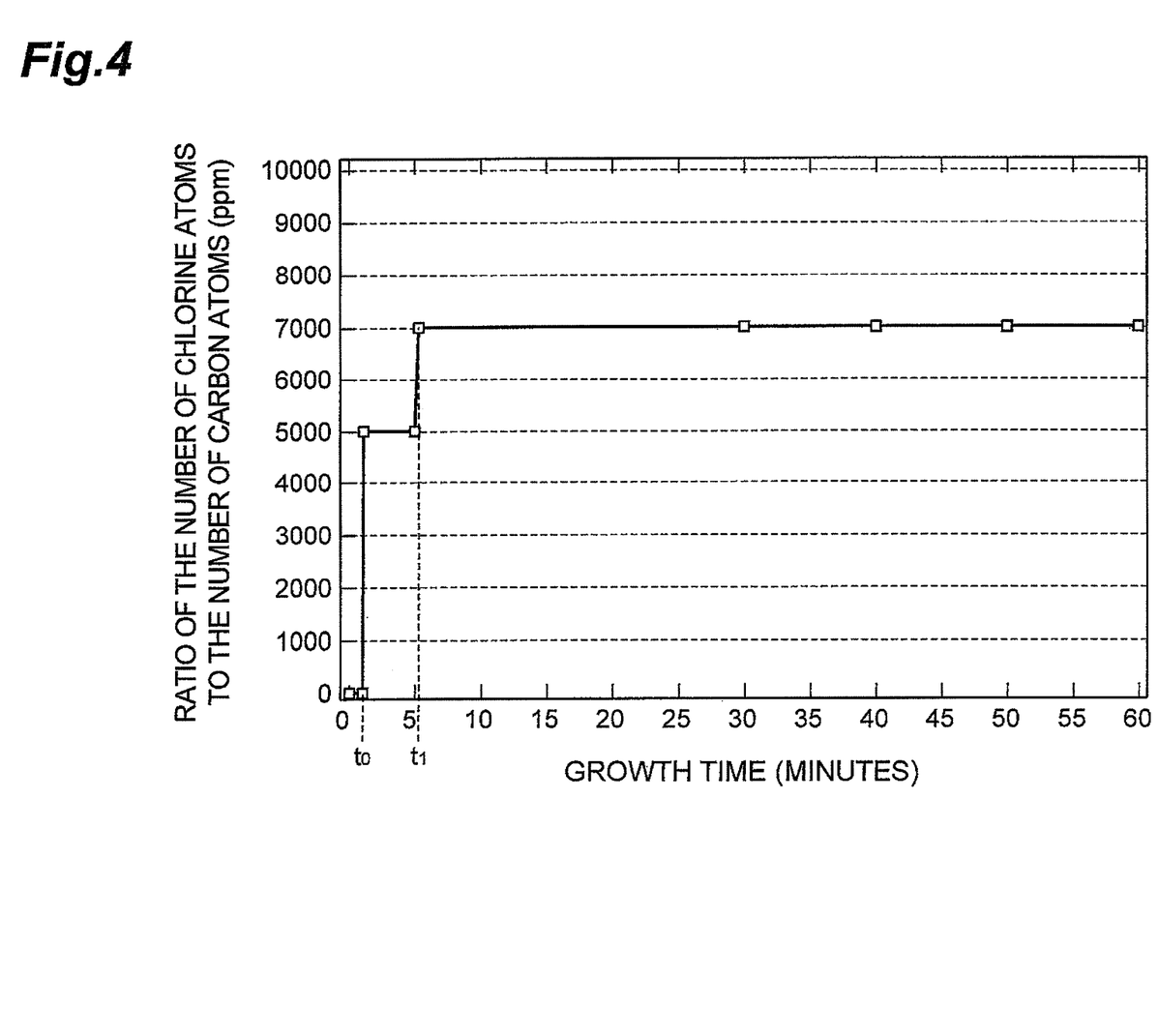
FIG. 4 is a graph showing an example of the relationship between the amount of halogen-containing material gas to be supplied and the elapsed time after start of growth of carbon nanotubes (that is, start of supply of raw material gas)

FIG. 4 is a graph showing an example of the relationship between the amount of the halogen-containing material gas 32 to be supplied and the elapsed time after start of growth of carbon nanotubes (that is, start of supply of the raw material gas 30) in step S15. The amount of the halogen-containing material gas 32 to be supplied is represented by a ratio of the number of chlorine atoms $N_{Cl}$ to the number of carbon atoms $N_C$ contained in the gas to be supplied into the reaction vessel tube 14 ($N_{Cl}/N_C$, in ppm). In this context, this graph is for the case that the catalyst 26 is $FeCl_2$, the halogen-containing material gas 32 is $Cl_2$, and the raw material gas 30 is $C_2H_2$.

As shown in FIG. 4, in this embodiment, by an instruction from the control unit 20, after the raw material gas 30 is started to be supplied and the predetermined time elapses, the halogen-containing material gas 32 is started to be supplied. Thereby, it results in that the halogen-containing material gas 32 arrives at the catalyst 26 after the raw material gas 30 arrives at the catalyst 26. In this context, the time from the start of supplying the raw material gas 30 to the start of supplying the halogen-containing material gas 32 is, for example, about one to two minutes. It is preferred that the amount of halogen-containing material gas 32 to be supplied in the start of supplying stage is several hundred ppm to several tens of thousands ppm, and in the example shown in FIG. 4, is 5000 ppm.

As shown in FIG. 4, after further time elapses from the start of supplying the halogen-containing material gas 32 (in FIG. 4, five minutes after the start of supplying the raw material gas 30), the amount of the halogen-containing material gas 32 to be supplied is preferably increased from 5000 ppm to 7000 ppm. That is, by an instruction from the control unit 20, compared to the amount of the halogen-containing material gas 32 to be supplied per unit time at the starting time $t_0$ of supplying the halogen-containing material gas 32 (5000 ppm), the amount of the halogen-containing material gas 32 to be supplied per unit time at the time $t_1$ later than the time $t_0$ (7000 ppm) is preferably made larger.

The effects obtained with the method and apparatus for producing carbon nanotubes according to this embodiment described above are now described. The length of carbon nanotubes is no more than about 2 mm at the maximum in conventional production methods, and a method by which more elongated carbon nanotubes as the material of lightweight high strength wire and the like may be produced has been desired. The inventors have conducted a study on factors to inhibit growth of carbon nanotubes at the time of growing carbon nanotubes to find the following fact. That is, when the raw material gas 30 to be a raw material of carbon nanotubes is supplied inside the reaction vessel tube 14, a carbon product other than carbon nanotubes, such as amorphous carbon is increasingly deposited on the catalyst particles 44, and the catalysis of the catalyst particles 44 are gradually decreased (so-called catalyst deactivation). Thereby, carbon nanotubes cannot exceed 3 mm to arrest their growth at the length of less than 3 mm.

In view of such phenomenon, in the production method and production apparatus according to this embodiment, at the time of growing carbon nanotubes, the halogen-containing material gas 32 to reduce the amount of a carbon product to be produced that deposit on the catalyst particles 44 is supplied inside the reaction vessel tube 14, in addition to the raw material gas 30. Since the amount of a carbon product to be deposited on the catalyst particles 44 during growth of carbon nanotubes is reduced by this, it is possible to inhibit decrease in catalysis of the catalyst particles 44 and to grow carbon nanotubes more elongated for a long time. Additionally, carbon nanotubes bristling on the substrate 28 via the catalyst particles 44 are sequentially taken out like a thread to be spinnable. That is, with the production method and production apparatus according to this embodiment, elongated carbon nanotubes can be produced, and length of spinnable carbon nanotubes can be extended to, for example, 2 mm or longer. It is also believed that carbon nanotubes can be grown to 1 cm or more by adjusting the growth conditions.

Additionally, as shown in FIG. 4, it is preferable that, compared to the amount of the halogen-containing material gas 32 to be supplied per unit time at the starting time $t_0$ of supplying halogen-containing material gas 32, the amount of the halogen-containing material gas 32 to be supplied per unit time at the time $t_1$ later than the time $t_0$ is larger. According to the findings of the inventors, the amount of a carbon product to be deposited on the catalyst particles 44 tends to increase as the time elapses after start of supplying the raw material gas 30. Then, as in this embodiment, it is possible to reduce more effectively the amount of a carbon product to be deposited on the catalyst particles 44 during growth of carbon nanotubes through increasing the amount of the halogen-containing material gas 32 to be supplied depending on elapse of time as described above.

By increasing the amount of a halogen-containing material gas 32 to be supplied depending on elapse of time, the following effect is also promising. That is, since chlorine atoms contained in the catalyst 26 placed inside the reaction vessel tube 14 before growth of carbon nanotubes are increasingly ejected outside the reaction vessel tube 14 with the elapse of time in the form of a chlorine compound or $Cl_2$ and the number of chlorine atoms inside the reaction vessel tube 14 are gradually decreased, the growth rate of carbon nanotubes is reduced with the elapse of time. However, when the amount of $Cl_2$ as the halogen-containing material gas 32 to be supplied is increased with the elapse of time, the decreased number of chlorine atoms inside the reaction vessel tube 14 can be compensated, so that the reduction in the growth rate of carbon nanotubes can be suppressed.

Additionally, in page 24, line 8 or later of the above-described Patent Literature 3, there is described that "As the oxidizing agent, water vapor, oxygen, ozone, hydrogen sulfide, acidic-gas, as well as lower alcohols such as ethanol and methanol, oxygen-containing compounds with the less number of carbon atoms such as carbon monoxide and carbon dioxide, and a gas mixture thereof are also effective. Among them, water vapor, oxygen, carbon dioxide, and carbon monoxide are preferred and, particularly, water vapor is used preferably." However, in this Patent Literature 3, "suitability of using a halogen-containing material", which is one of the characteristics of the production method and production apparatus according to this embodiment, is neither described nor suggested. With the production method and production apparatus according to this embodiment, a unique effect which does not exist in the inventions described in the prior art documents, that each carbon nanotube in a spinnable carbon nanotube assembly can be extended to, for example, 2 mm or more, can be achieved by supplying the halogen-containing material gas 32.

Now, that "carbon nanotubes are spinnable" is further described in detail. When one end of a carbon nanotube bundle vertically oriented on the substrate is picked out using tweezers or the like, carbon nanotubes may be spontaneously bonded to each other to be drawn out in a fibrous form. Such a phenomenon is called "spinnable." In this context, carbon nanotubes are spontaneously arranged in the drawn-out direction in the drawn-out fibrous structure, which is the most appropriate structure to exert the excellent material properties of carbon nanotubes in industrial application.

Examples of conditions to achieve such spinnability include the followings:
    carbon nanotubes are vertically arranged on the substrate.
    the linearity of the carbon nanotubes is extremely high as well as the carbon nanotubes are aggregated (bundled) in array state.
    bonding between the carbon nanotubes and the substrate is relatively weak.

In this context, no carbon nanotube array that satisfies all the above conditions exists among usual carbon nanotube arrays known so far, and thus, no other carbon nanotube arrays having spinning performance are not found. Although there are reports that carbon nanotube arrays with spinning performance have been synthesized from Tsinghua University of China, Commonwealth Scientific and Industrial Research Organisation (CSIRO), The University of Texas of the United States, Los Alamos National Laboratory of the United States, University of Cincinnati of the United States, and Osaka University, the lengths of the carbon nanotubes in these reports are all 1 mm or less. Accordingly, the thread diameter has to be thinned to about 10 µm or less in order to enhance the mechanical strength, and therefore the industrial operability is extremely low. In contrast, the carbon nanotubes produced according to this embodiment satisfy all the above-described conditions and have industrially greatly useful spinning performance.

The production method according to this embodiment is one exemplification in the case where the production apparatus 10 shown in FIG. 1 is used, but the method for producing carbon nanotubes can be performed even by using a production apparatus having a structure different from that of the production apparatus 10. That is, in order to grow carbon nanotubes, it is necessary only to maintain the above-described chemical gas phase reaction inside the reaction vessel tube 14. Accordingly, considering industrial production efficiency, the vaporized catalyst together with carrier gas may be supplied inside the reaction vessel tube 14.

Example 1

One example of the above-described embodiment is described hereinbelow. The inventors grew multi-walled carbon nanotubes on the substrate 28 using the production apparatus 10 shown in FIG. 1. The size of the substrate 28 was 10 mm in each of width and length and 1 mm in thickness. Additionally, the diameter of the reaction vessel tube 14 was 36 mm. Furthermore, the inner temperature of the reaction vessel tube 14 was set to 835° C., the temperature rising rate was set to 40° C. per minute, the amount of the catalyst 26 ($FeCl_2$) was set to 300 mg, the pressure of the raw material gas 30 ($C_2H_2$) was set to 8 Torr, and the flow rate of the raw material gas 30 was set to 200 sccm. Then, the carbon nanotubes were grown for a plurality of rounds, and the growing time in each round was variously changed.

Figure 5:
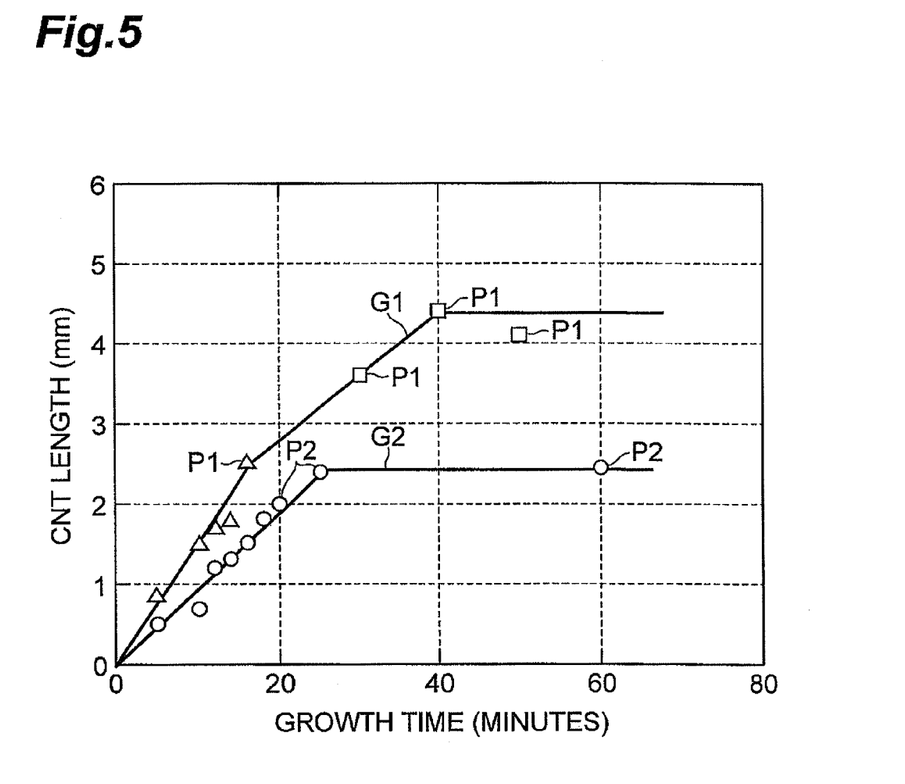
FIG. 5 is a graph showing the relationship between the length of the carbon nanotubes prepared in Example 1 and the growth time.

FIG. 5 is a graph showing the relationship between the length of the carbon nanotubes thus prepared and the growth time. Each plot P1 in FIG. 5 represents the length and the growth time of the carbon nanotubes in each round. Additionally, the graph G1 shown in FIG. 5 is the straight-line approximation of the relationship between the length and the growth time of the carbon nanotubes. In this context, in FIG. 5, the relationship between the length and the growth time in the case where the carbon nanotubes were grown using the method described in Patent Literature 2 is also shown (the plot P2 and the graph G2) for comparison.

Figure 6:
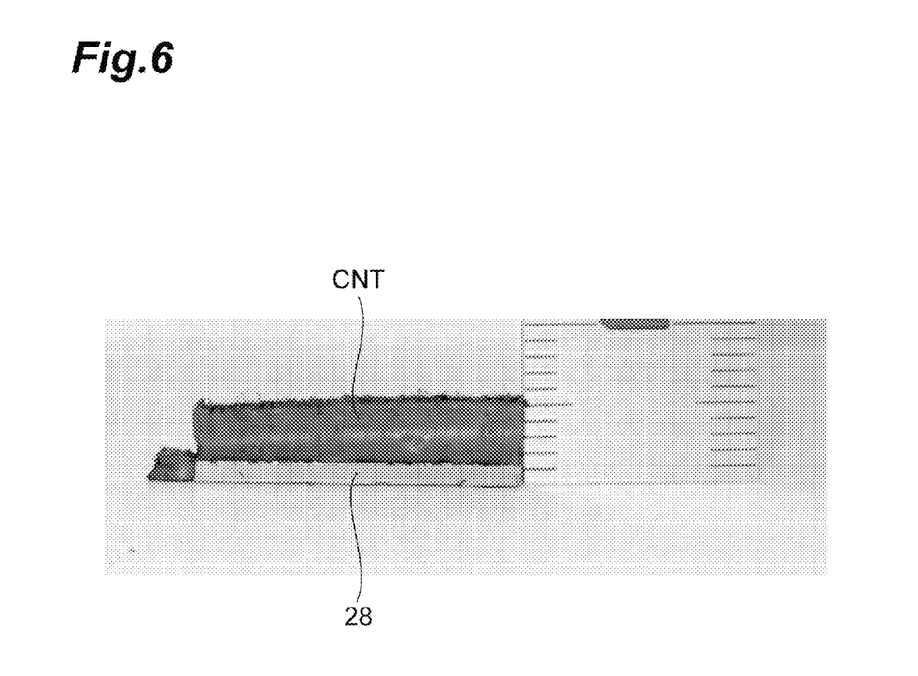
FIG. 6 is a photograph showing carbon nanotubes grown to a length more than 4 mm.

As shown in FIG. 5, in both the graphs G1 and G2, the carbon nanotubes grow as the time elapses, and the growth is arrested when a certain length is reached. However, comparing the graph G1 with the graph G2, the growth of the carbon nanotubes is arrested at the length of about 2 mm in the graph G2, whereas the carbon nanotubes continue to grow to the length more than 4 mm in the graph G1 of this embodiment. In this way, more elongated carbon nanotubes were obtained in this Example, compared to the conventional production method. Furthermore, FIG. 6 is a photograph showing carbon nanotubes 42 grown to a length more than 4 mm. Referring to FIG. 6, it can be seen that the carbon nanotubes 42 of such a length are vertically oriented on the substrate 28.

As is obvious from FIG. 6, a plurality of the carbon nanotubes 42 grown on the substrate 28 are crowded each other. Accordingly, when one end of a certain carbon nanotube 42 is drawn out, adjacent carbon nanotubes 42 are linked each other and spun into a long fibrous state without a break to be able to form a carbon nanotube fiber. As the beginning to draw out a carbon nanotube fiber, the carbon nanotube 42 may be picked out using tweezers, or the carbon nanotube 42 may be drawn out using a pressure-adhesive section. By simultaneously drawing out a plurality of the carbon nanotubes 42 extending over a certain width by use of a pressure-adhesive tape and the like, the carbon nanotubes 42 can be also drawn out as a carbon nanotube tape or a carbon nanosheet.

Example 2

Another example of the above-described embodiment is described hereinbelow. The inventors grew multi-walled carbon nanotubes on the substrate 28 using the production apparatus 10 shown in FIG. 1. The size of the substrate 28 was 10 mm in each of width and length and 1 mm in thickness. Additionally, the diameter of the reaction vessel tube 14 was 36 mm. Furthermore, the inner temperature of the reaction vessel tube 14 was set to 825° C., the temperature rising rate was set to 40° C. per minute, the amount of the catalyst 26 ($FeCl_2$) was set to 200 mg, the pressure of the raw material gas 30 ($C_2H_2$) was set to 2 Torr, and the flow rate of the raw material gas 30 was set to 200 sccm. Then, in addition to additionally supplying chlorine gas ($Cl_2$) as the halogen-containing material gas, amounts of the chlorine gas to be supplied were set from 0 ppm to 700 ppm, and carbon nanotubes were synthesized for 90 minutes with each of these amounts to be supplied.

Figure 7:
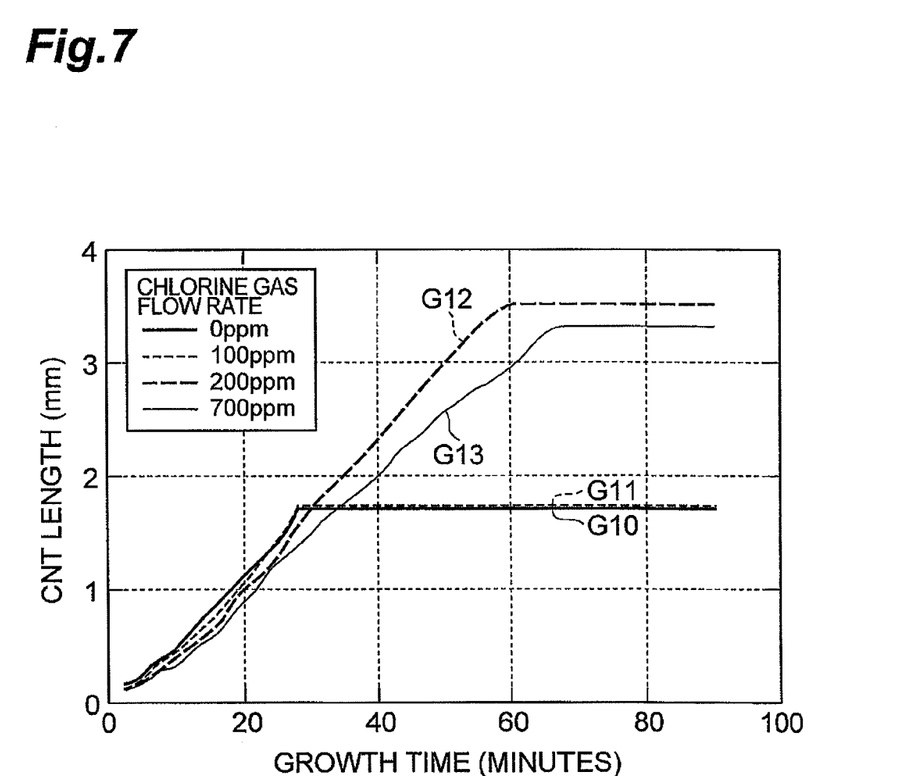
FIG. 7 is a graph showing the relationship between the length of the carbon nanotubes prepared in Example 2 and the growth time.

FIG. 7 is a graph showing the relationship between the length of the carbon nanotubes thus prepared and the growth time. The graphs G10 to G13 in FIG. 7 represents the relationship in which each flow rate of the chlorine gas is 0 ppm, 100 ppm, 200 ppm, and 700 ppm, respectively.

As shown in FIG. 7, in the graphs G10 and G11 in which the amounts of the chlorine gas to be supplied are 0 ppm and 100 ppm, the carbon nanotubes grow as the time elapses, and the growth is arrested when a certain length is reached (about 1.7 mm in this Example).

However, in the graphs G12 and G13 in which the amounts of the chlorine gas to be supplied are 200 ppm or more, the carbon nanotubes have grown to a length more than 3 mm. In this way, more elongated carbon nanotubes were obtained also in this Example, compared to the conventional production method. Additionally, in this Example, although the amount of chlorine gas to be supplied is about one-tenth compared to the above-described embodiment, elongated carbon nanotubes were obtained as in the above-described embodiment.

The method and apparatus for producing carbon nanotubes according to the present invention are not limited to the above-described embodiments, and other various variations can be made. For example, the present invention can be applied also in a general method in which catalyst particles such as Fe are formed on the substrate, hydrocarbon gas is supplied in a reaction vessel under atmospheric pressure or low pressure, the hydrocarbon is decomposed using catalysis of the catalyst particles, and carbon is taken out to be grown as carbon nanotubes.

Alternatively, in the above-described embodiment, although halogen-containing material gas including, for example, $F_2$, $Cl_2$, $Br_2$, HF, $CF_4$, HCl, HBr, or chlorides is used as a halogen-containing material to reduce the amount of carbon product to be formed on the surface of the catalyst, the halogen-containing material is not limited to these, and may only be materials that can reduce the amount of carbon product to be formed. Additionally, the phase of the halogen-containing material to be supplied in the vessel is not limited to gas and may be liquid or solid.

Alternatively, in the above-described embodiment, supply of the halogen-containing material gas is started after supply of the raw material gas is started, but these supplies can be started simultaneously. Alternatively, the amount of the halogen-containing material gas to be supplied is increased in the above-described embodiment, following the elapse of the predetermined time after supply of the halogen-containing material gas is started, but the amount of the halogen-containing material gas to be supplied may be constant, or may be increased or reduced as appropriate depending on elapse of time.

INDUSTRIAL APPLICABILITY

The present invention is applicable as a method and apparatus for producing carbon nanotubes that can produce elongated carbon nanotubes.

REFERENCE SIGNS LIST

10 . . . production apparatus, 12 . . . electric furnace, 14 . . . reaction vessel tube, 16 . . . heaters, 18 . . . thermocouple, 20 . . . control unit, 22 . . . gas supply unit, 23 . . . pressure adjustment valve, 24 . . . exhaust unit, 26 . . . catalyst, 28 . . . substrate, 30 . . . raw material gas, 32 . . . halogen-containing material gas, 42 . . . carbon nanotubes, 44 . . . catalyst particles, A . . . predetermined direction.

The invention claimed is:

1. A method for producing carbon nanotubes comprising a step of growing carbon nanotubes comprising:
supplying a carbon compound to be a raw material of the carbon nanotubes in a vessel in which a catalyst to grow the carbon nanotubes is charged,
wherein along with the raw material, a halogen-containing material comprising at least one of a halogen simple substance and a halogen compound is supplied into the vessel so as to reduce the amount of a carbon product produced besides the carbon nanotubes that deposits on the catalyst surface due to supply of the carbon compound,
the halogen-containing material comprises at least one of $F_2$, $Cl_2$, $Br_2$, HF, $CF_4$, HCl and HBr in an amount of 200 ppm or more; and
the halogen-containing material is made to arrive at the catalyst after the carbon compound arrives at the catalyst.

2. The method for producing carbon nanotubes according to claim 1, wherein, compared to the amount of the halogen-containing material to be supplied per unit time at the starting time $t_0$ of supplying halogen-containing material, the amount of the halogen-containing material to be supplied per unit time at the time $t_1$ later than the time $t_0$ is larger.

3. The method for producing carbon nanotubes according to claim 1, wherein the catalyst comprises iron halide compounds.

4. An apparatus for producing carbon nanotubes comprising:
a vessel for receiving and containing a catalyst to grow carbon nanotubes;
a raw material supply connected to the vessel, for supplying a carbon compound to be a raw material of the carbon nanotubes into the vessel; and
a halogen-containing material supply connected to the vessel, for supplying, along with the raw material, a halogen-containing material comprising at least one of a halogen simple substance and a halogen compound into the vessel, the halogen-containing material being selected so as to reduce the amount of a carbon product produced besides the carbon nanotubes that deposits on the catalyst surface due to supply of the carbon compound,
the halogen-containing material comprising at least one of $F_2$, $Cl_2$, $Br_2$, HF, $CF_4$, HCl and HBr in an amount of 200 ppm or more; and
further comprising a control unit that is configured to control supply of the carbon compound to the vessel by the raw material supply, and supply of the halogen-containing material to the vessel by the halogen-containing material supply,
wherein the control unit is further configured to control the raw material supply and the halogen-containing material supply so that the halogen-containing material arrives at the catalyst after the carbon compound arrives at the catalyst.

5. The apparatus for producing carbon nanotubes according to claim 4, further comprising a control unit that is configured to control supply of the carbon compound to the vessel by the raw material supply, and supply of the halogen-containing material to the vessel by the halogen-containing material supply,
wherein the control unit is further configured to control the halogen-containing material supply so that an amount of the halogen-containing material that is supplied per unit time at a starting time $t_0$ of supplying halogen-containing material, is less that an amount of the halogen-containing material that is supplied per unit time at a time $t_1$ that is later than the time $t_0$.

6. A method for producing carbon nanotubes comprising a step of growing carbon nanotubes comprising:
supplying a carbon compound to be a raw material of the carbon nanotubes in a vessel in which a catalyst to grow the carbon nanotubes is charged,
wherein along with the raw material, a halogen-containing material comprising at least one of a halogen simple substance and a halogen compound is supplied into the vessel so as to reduce the amount of a carbon product produced besides the carbon nanotubes that deposits on the catalyst surface due to supply of the carbon compound,
the halogen-containing material is made to arrive at the catalyst after the carbon compound arrives at the catalyst.

7. An apparatus for producing carbon nanotubes comprising:
a vessel for receiving and containing a catalyst to grow carbon nanotubes;
a raw material supply connected to the vessel, for supplying a carbon compound to be a raw material of the carbon nanotubes into the vessel; and a halogen-containing material supply connected to the vessel, for supplying, along with the raw material, a halogen-containing material comprising at least one of a halogen simple substance and a halogen compound into the vessel, the halogen-containing material being selected so as to reduce the amount of a carbon product produced besides the carbon nanotubes that deposits on the catalyst surface due to supply of the carbon compound, further comprising a control unit that is configured to control supply of the carbon compound to the vessel by the raw material supply, and supply of the halogen-containing material to the vessel by the halogen-containing material supply, wherein the control unit is further configured to control the raw material supply and the halogen-containing material supply so that the halogen-containing material arrives at the catalyst after the carbon compound arrives at the catalyst.

* * * * *